United States Patent [19]

Mas

[11] Patent Number: 5,028,830
[45] Date of Patent: Jul. 2, 1991

[54] ROTOR APPARATUS FOR AXIAL FIELD ELECTROMAGNETIC DEVICES

[75] Inventor: Joseph A. Mas, Morristown, N.J.

[73] Assignee: Allied-Signal Inc., Morris Township, Morris County, N.J.

[21] Appl. No.: 622,205

[22] Filed: Nov. 30, 1990

Related U.S. Application Data

[60] Continuation of Ser. No. 384,891, Jul. 24, 1989, abandoned, which is a continuation of Ser. No. 120,225, Nov. 12, 1987, abandoned, which is a continuation of Ser. No. 804,417, Dec. 4, 1985, abandoned, which is a division of Ser. No. 589,852, Mar. 16, 1984, abandoned.

[51] Int. Cl.$^5$ .............................................. H02K 17/16
[52] U.S. Cl. ..................................... 310/211; 29/598; 29/606; 29/609; 310/216; 310/268
[58] Field of Search ............... 310/211, 212, 216, 268, 310/42; 29/596, 598, 605, 609, 606

[56] References Cited

U.S. PATENT DOCUMENTS 2,469,808  5/1949  Aske ..................................... 310/268
3,401,287  9/1968  French et al. ........................ 310/168
4,363,988 12/1982  Kliman ................................. 310/268

Primary Examiner—Carl E. Hall
Attorney, Agent, or Firm—Gus T. Hampilos

[57] ABSTRACT

An axial field flow-through rotor apparatus comprises a structure formed of magnetic strip wound around a hub in such a way that the first and last layers of strip have surfaces that form coaxial cylinders and edges that define the inner and outer perimeters of parallel washer-shaped faces. The distance between the washer-shaped faces corresponds to the width of the magnetic strip. A plurality of equally spaced radial slots are cut into one of these faces to a selected depth corresponding to a portion of the strip width. A spider that is formed of conductive material and has one spoke for each slot is then placed into the cut face. A plurality of equally spaced radial slots are then cut into the other face at locations that correspond to those at which slots were cut into the first face and to a depth that corresponds to the previously uncut strip width. Thereafter, a second spider, formed of a conductive material and having one spoke for each slot, is placed into said other face.

9 Claims, 1 Drawing Sheet

ROTOR APPARATUS FOR AXIAL FIELD ELECTROMAGNETIC DEVICES

This application is a continuation of application Ser. No. 384,891, filed July 24, 1989, now abandoned, which in turn is a continuation of application Ser. No. 120,225, filed Nov. 12, 1987, now abandoned, which in turn is a continuation of application Ser. No. 804,417, filed Dec. 4, 1985, now abandoned, which in turn is a division of application Ser. No. 589,852, filed Mar. 16, 1984, now abandoned.

FIELD OF THE INVENTION

This invention relates to rotor apparatus for axial field electromagnetic devices such as motors and generators and methods of forming the same and more particularly to axial field rotor apparatus formed of a wound ribbon of magnetic material and methods of construction therefor.

BACKGROUND OF THE INVENTION

In U.S. Pat. No. 4,394,597, issued July 19, 1983, in the name of J. A. Mas and assigned to the Allied Chemical Corporation, there is disclosed multiple pole, axial field electromagnetic devices such as motors and generators in which the rotor and/or stator are formed of cylindrical core elements of annular cross-section having radial slots adapted to receive windings and/or conductors therein. More particularly, in several embodiments of the invention set forth in such patent, the rotor structure set forth takes the form of a cylindrical member having a plurality of radially disposed slots which are cut entirely therethrough while the magnetic return path for the rotor is separately provided apart from the rotating structure thereof.

As the invention set forth in such patent envisions the use of certain magnetic materials in strip or ribbon form, and in any event, rotor structure is generally required to be laminated, it will be appreciated that the formation of flow-through rotors, i.e., those having a separate magnetic return path in an axial or radial field devices can be a costly and time-consuming process especially when the material employed in the formation of the laminated rotor structure is relatively thin.

This may be appreciated, for instance, upon a consideration of B. Litman U.S. Pat. No. 2,550,571 which is directed to an axial gap motor and illustrates, as shown in FIG. 4, rotor structure wherein a rotor spider is employed to support a squirrel cage secondary member forming the pancake-like rotor disclosed therein. Within the conductive squirrel cage is formed the magnetic flux carrying member which is made up of a plurality of discrete, spaced sets of radial stacked tooth punchings 25 which are completely or nearly completely magnetically disconnected from one another and act to carry flux in an axial direction. The costly and time-consuming process of establishing the radial stacked tooth punchings 25 within such a rotor can readily be envisioned.

While the strip-like materials considered in U.S. Pat. No. 4,394,597 may take the form of such conventional materials as silicon iron or the like, the application additionally envisions the use of amorphous metallic alloys such as those available from Allied Corporation under its Metglas trademark due to the manner in which the same markedly reduce hysteresis and eddy current losses as a result of the high electrical resistivity characteristics and the low coercivity manifested thereby. These materials are preferred since, in essence, when amorphous magnetic alloys of this type are employed in the axial field electromagnetic devices described in the aforementioned U.S. patent, resulting core losses exhibited tend to be approximately one-seventh of those present when conventional materials are utilized. However, such amorphous magnetic alloys are typically available only in the form of strips, tape or ribbon which are relatively thin and hence configuring the same into appropriate core configurations is generally a time-consuming costly process and this is especially true when flow-through rotor apparatus is considered.

Therefore, it is an object of this invention to provide methods of manufacturing rotor structures from strips or ribbons of magnetic material.

A further object of this invention is to provide flow-through rotor structures formed of strips or ribbons of magnetic material.

An additional object of this invention is to provide methods of manufacturing flow-through rotor apparatus from strips or ribbons of magnetic material.

Another object of the present invention is to provide squirrel cage, axial field rotor structure formed of strips or ribbons of magnetic material.

A further object of the present invention is to provide methods of making squirrel cage axial field rotor structure from strips of thin magnetic material.

Various other objects and advantages of the present invention will become clear from the following detailed description of an exemplary embodiment thereof, and the novel features will be particularly pointed out in connection with the claims appended hereto.

SUMMARY OF THE INVENTION

In accordance with the teachings of the present invention, flow-through rotor apparatus and methods for making the same from magnetic material in strip form are provided wherein a strip of magnetic material is wound upon a hub to form a cylindrical structure having first and second circular faces having a desired diameter and a width between faces corresponding to the width of the magnetic material in strip form; a plurality of equally spaced radial slots are cut into one of the circular faces to a selected depth corresponding to a portion of the width between faces; a spider formed of conductive material and having one spoke for each slot cut is then placed into the circular face having a plurality of equally spaced radial slots cut therein; the cylindrical structure is then reversed and a plurality of equally spaced radial slots are cut into the remaining one of the circular faces at locations corresponding to the locations at which slots were cut into said one of said circular faces to a depth corresponding to the remaining uncut width between faces; and a spider formed of conductive material and having one spoke for each slot cut is placed into said remaining circular face to complete the formation of a flowthrough rotor formed of magnetic material in strip form.

BRIEF DESCRIPTION OF THE DRAWINGS

The invention will be more clearly understood by reference to the following detailed description of an exemplary embodiment thereof in conjunction with the accompanying drawings in which.

DETAILED DESCRIPTION OF THE INVENTION

Figure 1:
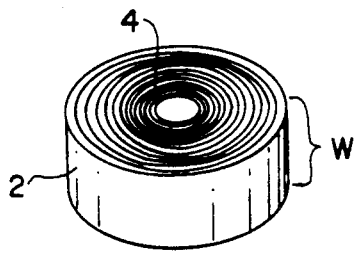
FIG. 1 shows an initial cylindrical structure formed in accordance with an exemplary embodiment of the present invention by winding magnetic material in strip form upon a hub so that the same may be further configured into rotor apparatus.

Referring now to the drawings and more particularly to FIG. 1 thereof, there is shown a cylindrical structure initially formed in accordance with an exemplary embodiment of the present invention by winding magnetic material 2 in strip form upon a hub 4. The magnetic material in strip form may take any of the conventional forms of materials such as silicon iron or the various forms of amorphous magnetic alloy described in U.S. Pat. No. 4,394,597, as aforesaid, which is hereby specifically incorporated by reference herein. The width W of the strip of magnetic material would vary depending upon the thickness of the flow-through rotor structure to be configured, as well as the available range of widths which may be conveniently fabricated for the magnetic strip material selected and may typically be of an order of approximately one-inch. Similarly, the thickness T of the magnetic strip material would also be a function of the material selected, however, the same would generally range from 1 to 5 mils in thickness for the materials being described.

The hub 4 may take any of the conventional forms of hub structure suitable for placement in a winding machine to have the magnetic strip, ribbon or tape material wound thereon and is configured, as shall be seen below, to have a central aperture therethrough to accept the central structure of the spider to be employed herein. It should be noted, however, that under these circumstances the central hub of the spider will be similarly apertured so that the same accepts the shaft of the motor in which the rotor being formed is to be mounted. Alternatively, the hub 4 could be configured to be mounted upon the motor shaft per se and under these circumstances would cooperate with the spokes of the spider, as shall be seen below, to form an integral central hub portion thereof. Thus, the hub 4 would typically be configured of copper, aluminum or the like which may be suitably machined into appropriate form. However, as the principal function of the hub is to merely have a roll of magnetic material disposed thereon, other materials are readily available therefor including magnetic or non-magnetic materials, as well as various forms of plastic or graphite materials and the like.

For purposes of manufacturing convenience, it has been found useful to employ a 2-piece copper hub which is soldered and thereafter placed in a winding machine to have a strip of magnetic material disposed thereon. Thus, a hub 4, configured in the manner described, is placed in a winding machine so that magnetic material in the form of amorphous magnetic alloy or the like is wound thereon in the manner illustrated in FIG. 1. The number of turns of magnetic material wound on the hub will govern the resulting thickness of the rotor after it is wound and, as well known to those of ordinary skill in the art, the diameter selected will be a function of the size and torque requirements of the motor being designed under conditions where the more powerful the motor selected, the larger the diameter employed.

Figure 5:
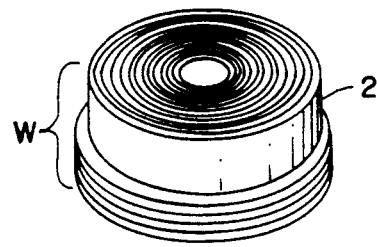
FIG. 5 illustrates the cylindrical rotor structure shown in FIG. 4 in an inverted position preparatory to operating upon a second face thereof.

Upon completion of the manufacturing step illustrated in FIG. 1, a roll of amorphous metal alloy, silicon iron or any of the other material disclosed in U.S. Pat. No. 4,394,597 will be disposed on the hub 4 to present, as illustrated in FIG. 1, an initial rotor structure whose diameter is a function of the thickness T of the magnetic strip material 2 employed and the number of turns wound and whose height between opposing circular faces corresponds to the width W of the magnetic strip or tape material employed. It will also be appreciated by those of ordinary skill in the art that the initial rotor structure formed in this manner is laminated in the manner dictated by each turn of the magnetic strip material wound so that the same may subsequently be configured, in a manner to be described below, to form either a flowthrough rotor configuration, i.e. one having no magnetic return path such as shown, for instance, in FIGS. 5D and 6B of U.S. Pat. No. 4,394,597 or, alternatively, into a rotor configuration having its own return path when the same is only partially cut through.

Figure 2:
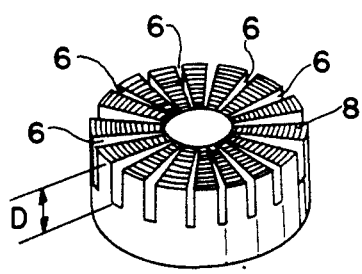
FIG. 2 illustrates the manner in which a plurality of equally spaced radial slots are cut to a desired depth into one face of the rotor structure being formed.

Referring now to FIG. 2, there is shown the manner in which a plurality of equally spaced radial slots are cut to a desired depth D into one face of the rotor structure being formed. More particularly, as shown in FIG. 2, a plurality of radial slots 6 are cut into a first face 8 of the roll of magnetic material formed in the manner illustrated in FIG. 1. The radial slots 6 are all uniform in width and uniformly distributed about the circumference of the roll of magnetic material formed. The slots, as will be readily appreciated by those of ordinary skill in the art, may be conveniently cut into the first face of the roll of magnetic material by placing the roll of magnetic material in a chuck of a milling machine that is indexed and using the same to cut diametrically across the first face 8 to form a first pair of slots. Thereafter, the machine is indexed and a second diametric cut across the first face is made to form a second pair of slots and the milling machine is again indexed and this is continued until a desired number of slots, typically ranging from 28 to 48 in number are formed in the first face 8 of the roll of magnetic material. The depth D of each slot formed conveniently corresponds to one-half the width W of the magnetic strip material employed since, a selection of this depth allows the rotor apparatus being formed to maintain maximum structural stability throughout the course of the various cutting or milling operations being performed and, of course, only a single setup for the milling machine will be required for each of the cutting operations illustrated in FIGS. 2 and 6. However, as will be readily appreciated by those of ordinary skill in the art, the depth of the cut selected in association with the forming steps associated with FIGS. 2 and 6 may be any arbitrary fraction of the total width W of the magnetic strip material so long as the sum of the depths D of the cuts illustrated in FIGS. 2 and 6 corresponds to the full width W of the strip material so that the cutting of slots illustrated in FIGS. 2 and 6 ultimately results in cutting entirely through the medium. Of course, should it be desired to retain a magnetic return path as a portion of the rotor being formed, cuts along only one face of the roll of magnetic material will be made unless such return path is to be located in the center of the rotor being formed.

In the description of the cutting of the slots in the roll of magnetic material illustrated in FIG. 2, cuts across the entire diameter of the roll of magnetic material have been discussed and it will be appreciated by those of ordinary skill in the art as the disclosure of the instant invention proceeds, that a cutting through of the hub is of little consequence. However, should it be desired to employ a forming technique wherein the central hub 4 is not entirely cut through, the slots may be formed by again chucking the roll of magnetic material entirely about its periphery and employing a milling machine to make radial cuts on the first face of the roll of magnetic material which do not fully cut through the entire hub. Thus, while this approach may impart certain manufacturing advantages wherein it is desired not to cut entirely through the hub 4, the machining care involved will be somewhat more exacting.

Typically, the cutting of the slots in the first face 8 of the roll of magnetic material may be performed, regardless of the magnetic material employed, on a standard milling machine employing a cutting wheel which is lubricated by conventional oil lubricants in the same manner that metals are conventionally cut in such milling machines. However, an alternate procedure would be to employ an abrasive wheel which was run sufficiently slowly so that no lubrication was required. Furthermore, as will be readily appreciated by those of ordinary skill in the art, either a vertical or horizontal milling machine is appropriate for the task and the desired indexing from one slot to the next could be implemented through a conventionally indexed rotating table for such milling machines.

In addition, rather than employing actual cutting techniques, surface grinding techniques could be similarly employed to achieve the same purpose and to this result, a variety of conventional grinding machines may be employed. In the course of various cutting techniques employed, no problems associated with the fusing of the various laminations in the roll of magnetic material formed have been encountered in association with the cutting of the slots 6. Thus, at the conclusion of the rotor forming step illustrated in FIG. 2, a plurality of radially disposed slots 6 which are uniform in width and uniformly distributed about the circumference of the first face 8 of the roll of magnetic material may be assumed to have been cut halfway through the roll of magnetic material to a depth D.

Figure 3:
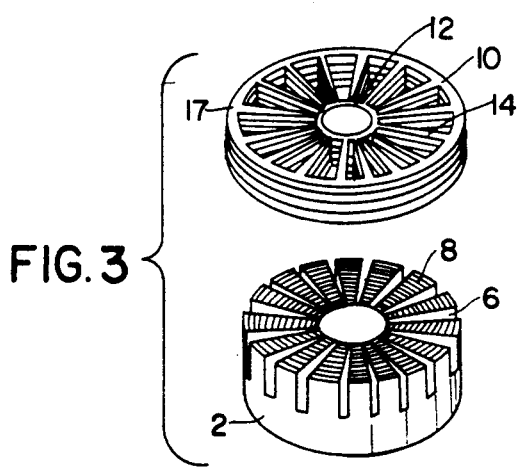
FIG. 3 shows the manner in which a spider formed of conductive material may be positioned for insertion in the slotted face of the cylindrical structure.

Once the initial face 8 of the roll of magnetic material has been slotted in the manner illustrated in FIG. 2, the partially formed rotor has shorted conductors in the form of a spider inserted into the slotted face 8 thereof in the manner illustrated in FIG. 3. Thus, as shown in FIG. 3, a spider 10 may be positioned for insertion into the slotted face of the cylindrical structure formed by the roll of magnetic material whose first face 8 has been slotted. The spider 10 may take the conventional form of an aluminum or copper spider or alternatively, low temperature alloys of conductive material may be employed. The spider 10 has an inner hub portion 12 which, in the embodiment of the invention being illustrated, is adapted to be inserted into the hub 4 upon which the magnetic strip material 2 has been wound. The central portion or aperture in the hub 12 is of an appropriate diameter and configuration to be mounted upon the shaft of the motor being formed and, while not illustrated in FIG. 3, may have an appropriate key slot or the like cut therein to accommodate such shaft.

In addition, the spider 10 has one radial spoke 14 for each radial slot 6 cut into the first face 8 of the roll of magnetic material and each spoke 14 is of uniform width and positioned within the periphery of the spider 10 so that the same will be readily disposed within the radial slots 6 cut into the roll of magnetic material. The spider 10 has, in the conventional manner, a circumferential outer ring 17 interconnecting the outer portion of each spoke 14 and the same is disposed from the center of the spider 10 a radial distance to closely fit about the periphery of the roll of magnetic material so that when the same is inserted into the cut face 8 of the roll of magnetic material, a squirrel cage configuration is formed. It should also be noted that in cases where the central hub 4 is formed of the same material as the spider 10 the central hub 12 of the spider may be omitted provided the spokes 14 are extended to fit within the cutaway portions of the hub 4 and coact therewith for mounting on the motor shaft. For this purpose, soldering of the spokes to the hub 4 may be employed.

Figure 4:
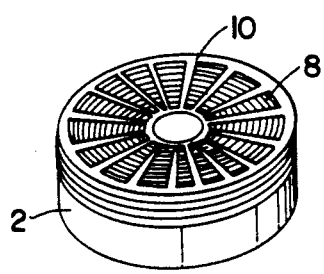
FIG. 4 depicts the spider illustrated in FIG. 3 inserted into the slotted portion of the cylindrical rotor apparatus being formed.

The spider 10 as illustrated in FIG. 3 may take the form of a stack of stampings, each of which is approximately a sixteenth-of-an-inch in thickness or any other width which is conveniently manufactured through a stamping process so that the same may be individually placed into the slots 6 in the first face 8 in the roll of magnetic material until a sufficient number of them have been disposed therein, in the manner illustrated in FIG. 4, to entirely fill the depth of the initial slots cut therein. Alternatively, a one-piece spider may be machined for placement into the cut faces of the roll of magnetic material, however, this approach includes somewhat greater manufacturing expense.

As an alternate to either of these approaches, the cut areas of the roll of magnetic material could be coated and a spider material deposited therein through a dip or deposition technique or alternatively, the same could be placed in a mold and an appropriate spider cast into the cut portions of the roll of magnetic material as well as about the periphery thereof and within the hub. Here, however, it should be noted, that the availability of the casting technique would be a function of the type of magnetic material 2 employed and hence if a Metglas compound were utilized as the magnetic material, steps would have to be taken to insure that the melting point of the conductive material employed for the spider was below the crystallization temperature of the magnetic material. Thus, in the case of metallic glasses, the crystallization temperature is approximately 600° and hence a low temperature alloy would have to be employed for the material of the spider should a casting technique be employed.

Regardless of the manner in which the spider 10 is formed, the same is inserted into the cut face 8 of the roll of magnetic material to the full depth of the cuts therein in the manner illustrated in FIG. 4. Thus in FIG. 4, the stamped spiders 10 illustrated in FIG. 3 are shown as inserted into the cut face 8 of the roll of magnetic material to form one-half of the rotor. The use of stamped spiders illustrated is viewed as highly advantageous as the same can be easily manufactured and thereafter merely placed into the cut face 8 of the roll of magnetic material in succession until the cut face is filled to the cut surface 8. At this juncture, it will also be appreciated by those of ordinary skill in the art that the structural integrity and hence rigidity of the roll of magnetic material is restored by the insertion of the conductive spiders 10 despite the cutting techniques imposed thereon in association with the step illustrated in FIG. 2.

Once the spider material has been placed into the cut face of the rotor in the manner illustrated in FIG. 4, a continuation of the formation of the rotor for the remaining face of the magnetic material may occur as the structural rigidity associated with the initial face of the roll of magnetic material operated upon has been restored. Further in this regard, it should be noted that if spider stampings which are very thin are employed in the manner illustrated, once the arrangement shown in FIG. 4 is achieved, such stampings and the cut face of the rotor which is exposed may be shellacked or treated with an appropriate adhesive or epoxy material to maintain the same in place. Thereafter, the entire rotor arrangement is inverted in the manner illustrated in FIG. 5 whereupon the second face of the roll of magnetic material may be configured.

Figure 6:
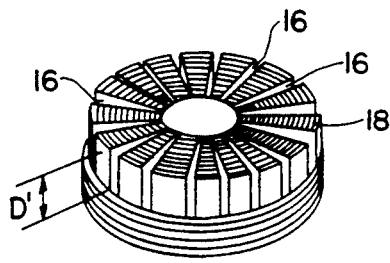
FIG. 6 shows the manner in which a plurality of equally spaced radial slots are cut through from the second face of the rotor apparatus being formed.

Once the roll of magnetic material is inverted in the manner illustrated in FIG. 5, the same may then again be chucked all around and placed in a milling machine so that radial slots 16 may be again cut into the second face 18 of the roll of magnetic material in the manner illustrated in FIG. 6. This is implemented in the same manner described in connection with FIG. 2, it being noted that the slots 16 cut in association with the processing step illustrated in FIG. 6 must be arranged so that the same are aligned with those cut during the milling operation described in connection with FIG. 2. In addition, the depth D' of the slots cut in association with the processing step illustrated in FIG. 6 is such that the slots 16 will connect with the slots 6 cut during the method step illustrated in FIG. 2. Thus the sum of the slot depths D+D' here must correspond to the width W of the strip of magnetic material, and as a result thereof, the slots 16 cut during the manufacturing step illustrated in FIG. 6 connect to the spoke of the first inserted spider stamping 10.

Figure 7:
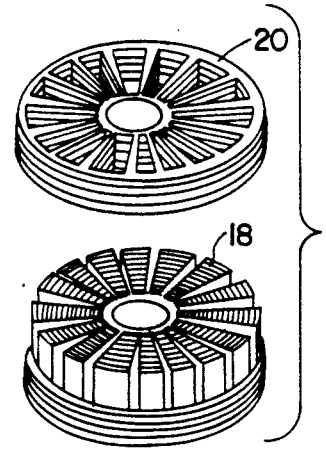
FIG. 7 illustrates the manner in which a spider may be positioned for insertion in the slotted remaining face of the rotor structure being formed.
Figure 8:
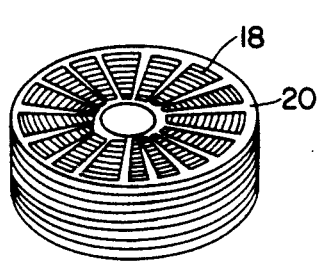
FIG. 8 depicts the completed rotor structure.

Thereafter, in the manner illustrated in FIG. 7, the second set of spider stampings 20 may be inserted into the second cut face 18 of the roll of magnetic material in precisely the same manner described in connection with FIGS. 3 and 4. Furthermore, it should be appreciated that while the second spider 20 has been again illustrated as a stack of stampings, any of the variations thereof described in association with FIG. 3 may be employed. However, thin stampings for the second spider 20 are again viewed as the most advantageous since the same may be inserted one at a time until the entire distance of the slot depths are filled to the second face 18 of the roll of magnetic material. In this manner, the laminated flow-through rotor configuration is formed as an axial-wound squirrel cage device in the manner illustrated in FIG. 18. Furthermore, in precisely the same manner as described in connection with FIG. 4, once the second set of spiders 20 has been inserted into the second cut face 18 of the roll of magnetic material as shown in FIG. 8, the entire rotor formed may be treated with shellac, or an appropriate adhesive or epoxy to insure the mechanical stability thereof. This stability may be further enhanced, if desired, by the insertion of mechanical devices such as screws about the periphery of the rotor formed to insure the mechanical integrity thereof during high-speed rotation. Thus it will be seen that through the utilization of the highly convenient manufacturing techniques illustrated in FIGS. 1–8, an integral rotor configuration is achieved which is made up of very thin laminations of magnetic material originally fabricated in strip form. The result is a structure which is highly uniform in regard to the number of laminations per segment while being manufactured without undue expense or inconvenience. Absent these techniques, it will be appreciated that the physical placement of thin laminations of magnetic material within the spider employed to form a squirrel cage arrangement would be highly complex and expensive, as well as not being well-suited to the production of commercial devices. Thus, for instance, should prior art stacking techniques be attempted by way of application to the production of flow-through rotors formed of Metglas amorphous metal alloys or the like, it will be appreciated that thousands of tiny pieces of magnetic material would have to be stacked within a spider and would result in a manufacturing approach which, if successful, would be exceedingly expensive as well as highly unreliable.

While the invention is described in connection with a preferred exemplary embodiment thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

What is claimed is:

1. An axial field flow-through rotor apparatus comprising:
    (a) a strip of magnetic material wound about a hub to define a cored cylindrical structure having a first and second circular faces formed by the edges of the strip, with the distance between the first and second faces in a direction parallel to the axis of said cylindrical structure equal to the strip width;
    (b) a plurality of radially uniformly spaced slots having been cut into said first and second circular faces and into said hub whereby said slots extend entirely through the cylindrical structure between said first and second circular faces and entirely through said hub; and
    (c) spider means having an inner hub, an outer circular member and a plurality of radial spokes corresponding to said plurality of slots and disposed within said cylindrical structure and thereabout by engagement within said slots, said spider means being coextensive with said slots, the diameter of said outer circular member being such as to fit over said cylindrical structure in contact therewith, said spokes being sized to fit in said slots in contact with the walls thereof, said spider means being formed of conductive material and said spider means coacting with said cylindrical structure to define a squirrel cage configuration.

2. A rotor as in claim 1 wherein said spider means comprises a plurality of thin metal stampings stacked upon each other.

3. A rotor as in claim 1 wherein said strip of magnetic material is of an amorphous metal alloy.

4. A rotor as in claim 1 wherein said strip making up said cylindrical structure has a thickness of about 1-5 mils (25-125 micrometer).

5. A rotor as in claim 1 wherein said inner hub of said spider means is of a size sufficient to receive the shaft of a motor in which said rotor is to be mounted.

6. A rotor as in claim 1 wherein the material employed for the spider means has a melting point below the crystallization temperature of the material of which said strip making up said cylindrical structure is made.

7. A rotor as in claim 1 wherein the faces of said cylindrical structure are shellacked to maintain said spider means in place.

8. A rotor as in claim 1 wherein the faces of said cylindrical structure are treated with one of adhesive or epoxy material for maintain said spider means in place.

9. An axial field flow-through rotor apparatus comprising:
 (a) a strip of magnetic material wound about a hub to define a cored cylindrical structure having first and second circular faces formed by the edges of the strip with the distance between the first and second faces in a direction parallel to the axis of said cylindrical structure equal to the strip width;
 (b) a plurality of radially uniformly spaced slots having been cut into said first and second circular faces and into said hub whereby said slots extend entirely through the cylindrical structure between said first and second circular faces, radially through a portion of said hub and axially entirely therethrough; and
 (c) spider means comprising an outer circular member and a plurality of radical spokes corresponding to said plurality of slots and disposed within said cylindrical structure and thereabout by engagement within said slots, said spider means being coexistive with said slots, the diameter of said outer circular member being such as to fit over said cylindrical structure in contact therewith, said spokes being sized to fit in said slots in contact with the walls thereof, said spider means coacting with said cylindrical structure to define a squirrel cage configuration.

* * * * *

UNITED STATES PATENT AND TRADEMARK OFFICE
CERTIFICATE OF CORRECTION

PATENT NO. : 5,028,830
DATED : July 2, 1991
INVENTOR(S) : Joseph A. Mas

It is certified that error appears in the above-identified patent and that said Letters Patent is hereby corrected as shown below:

IN CLAIM 8.

Col. 9, line 18, "maintain" should be --maintaining--.

Signed and Sealed this

Third Day of November, 1992

*Attest:*

DOUGLAS B. COMER

*Attesting Officer*   *Acting Commissioner of Patents and Trademarks*